Nov. 2, 1943. E. R. SWANK 2,333,277
EXPANSION RIVET
Filed May 12, 1942
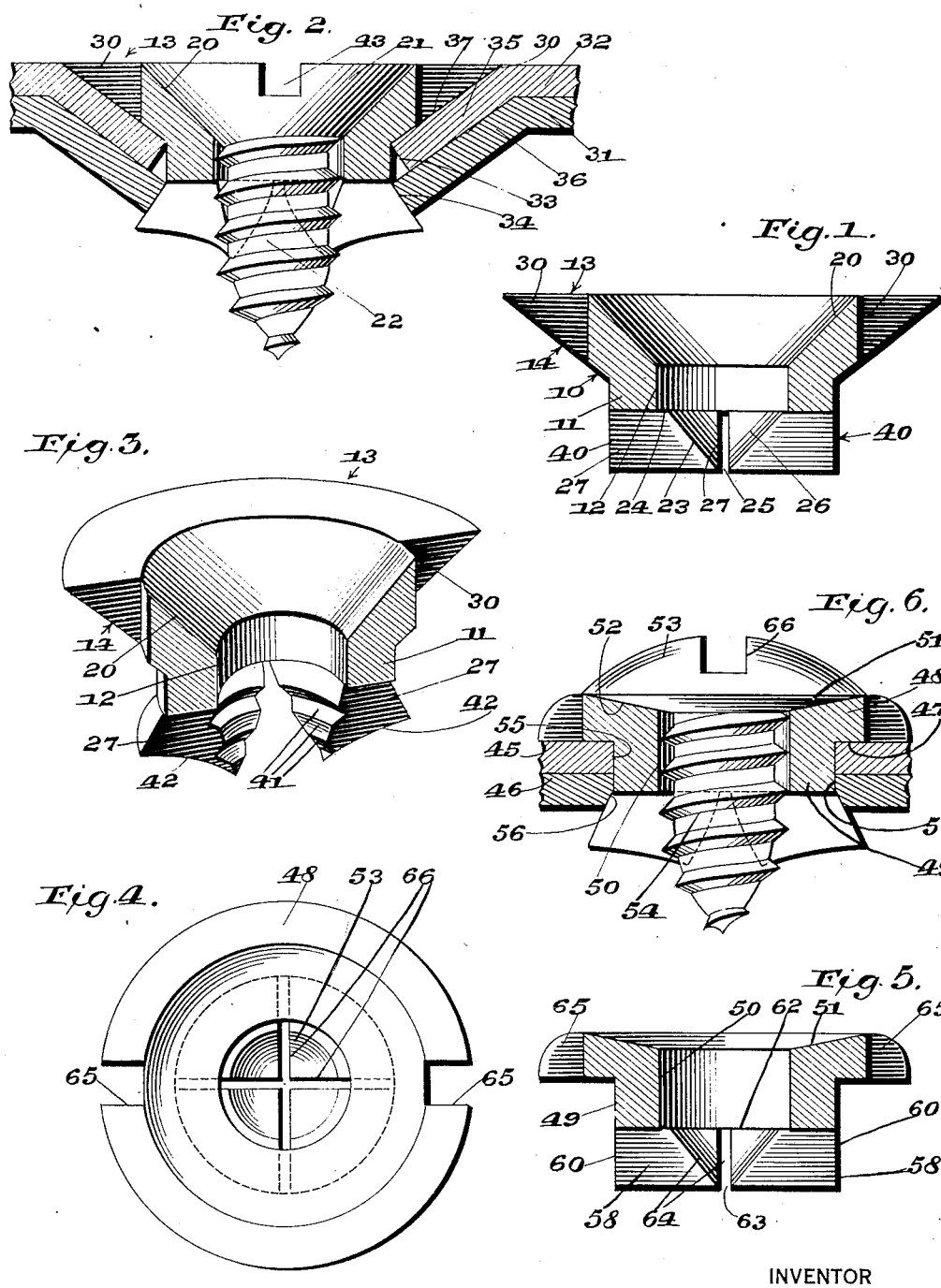
INVENTOR
E. R. Swank
BY
Munn, Liddy, Glaccum & Kane
ATTORNEY Patented Nov. 2, 1943

2,333,277

UNITED STATES PATENT OFFICE 2,333,277

EXPANSION RIVET

Everett R. Swank, Mansfield, Ohio

Application May 12, 1942, Serial No. 442,674

2 Claims. (Cl. 85—40)

This invention relates to expansion rivets.

An object of the invention is the provision of a device for securing two or more flat strips or sheets of metal together in which a hollow rivet is received by alined perforations in the strips or sheets with one end of the rivet being provided with a head forming a shoulder which engages the outer face of one sheet while the opposite end of the rivet is split so that when a wood screw is forced through a contral passage in the rivet the inner slotted end of said rivet will be forced radially outwardly against the walls of the perforation formed in the inner strip for locking the rivet in place and for securing the strips or plates in rigid relation.

A further object of the invention is the provision of a device for securing strips of material together in flat contact in which strips are formed alined perforations with one of the perforations being flared, a hollow rivet being received by the perforations and provided with a central passage which is tapered at its inner end adjacent the flared perforation so that when a wood screw is forced through the rivet the inner segments of the rivet will be forced outwardly as the threads of the screw bite into the inner walls of the tapered passage, the inner end of the rivet being provided with radial slots to form the segments.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a vertical section of a rivet constructed according to the principles of my invention.

Figure 2 is a similar vertical section of the rivet showing a wood screw forced through the hollow rivet for causing the rivet to connect a pair of strips of material together.

Figure 3 is a view in perspective partly in section showing the condition of the rivet after it has been expanded by a screw.

Figure 4 is a plan view of a modified form of combined rivet and screw.

Figure 5 is a vertical section of a modified form of a rivet shown in Fig. 4.

Figure 6 is a vertical section of the modified form of the rivet shown in operative relation for connecting strips of material together when a wood screw is forced through the hollow rivet.

Referring more particularly to the drawing, 10 generally designates a rivet which consists of a barrel or cylindrical portion 11 having a central passage 12. This rivet is also provided with a head 13 which forms a shoulder 14 with the barrel portion 11.

The central passage 12 has a flared outer portion 20 to receive a head 21 of a wood screw 22. The inner end of the passage as shown at 23 is tapered from an intermediate portion 24 to the extreme inner end designated by the numeral 25.

The cylindrical portion 11 of the rivet which is located between the extreme inner end of the rivet and a plane passing through the wide end of the tapered passage 26 is slotted as shown at 27 and these slots are not only formed radially but they extend from the tapered portion 26 of the passage 12 through the outer walls of the cylindrical barrel portion 11. Any number of these slots may be employed for the purpose.

The head 13 of the rivet 10 is provided with diametrically disposed slots 30 which are adapted to be engaged by any suitable tool so that the rivet may be held stationary when the screw 22 is forced into the rivet.

In this type of rivet the perforations in the strips or plates which are adapted to be connected together by the rivet must be specially punched as illustrated in Fig. 2. An inner plate or wall 31 is adapted to have applied thereto a second plate or strip 32. These plates are placed in flat contact with each other and a perforation 33 is punched in plate 32 while a perforation 34 is punched in plate 31. The forming of these perforations may be done simultaneously or they may be formed separately. However the material surrounding the perforations 33 and 34 is likewise punched inwardly as shown at 35 and 36 to provide a conically shaped seat for the flaring head 13 of the rivet. In other words, the rivet has an undercut bevel as shown at 14, which neatly seats upon the inclined or conically shaped face 37 of the plate or strip 32.

It will be noted from Fig. 2 that the wall of the perforation 34 is flared outwardly and a similar flaring is found in the wall embracing the perforation 33.

As has been explained above, a wood screw 22 is employed which is forced into the central passage 12 of the rivet 10 and when this happens the threads of the screw bite into the inner edges of the segments at the inner end of the rivet while forcing the segments outwardly so that the outer walls 40 of these segments will neatly engage the flared walls of the perforation 34 and thus the rivet will not only be fixed in place but will bind the two members 31 and 32 together. Where the material of the rivet is sufficiently soft, as has been stated above, the threads of the screw 22 will form grooves 41 in the inner walls of the segments 42 which are formed by the slotting of the inner end of the barrel of the rivet.

It will be noted that the head 21 of the screw 22 is provided with the usual slot 43 which is adapted to be engaged by a suitable instrument for forcing the screw in place.

In the modified form shown in Figs. 5 and 6, it will be seen that the strips of material 45 and 46 which are bound together are flat throughout their length so that the shoulder 47 formed between a head 48 and a barrel 49 lies in flat contact with the flat outer surface of the strip 45. The central passage 50 of the rivet has a flared outer portion 51 to receive the bevel surface 52 on the inner end of a head 53 of a screw 54. However in this case the head of the screw extends beyond the surface of the outer strip 45 while the head 21 of the screw 22 and the head 13 of the rivet 10 in Figs. 1 to 3 inclusive lie flush with the outer surface of the strip or plate 32.

The walls of the perforation 55 in the plate 45 are at right angles to the surfaces of the said plate. A portion 56 of the wall of the perforation 57 in the plate 46 is flared outwardly so that when the screw 54 is forced through the slotted segments 58 at the inner end of the barrel portion 49 of the rivet, said segments will be forced outwardly with the outer walls 60 of the segments 58 being forced in snug engagement with the inclined portions 56 of the perforation 57.

It will also be noted that the inner end of the passage 50 which is located centrally within the rivet in Figs. 5 and 6 is also tapered from an intermediate portion 62 to the extreme reduced outer end 63 and where the radial slots 64 have formed the segments 58, and meet along the longitudinal axis of the passage 50.

The rivet is provided with diametrically disposed notches 65 to receive a suitable tool for retaining the rivet against rotation when the screw 54 is forced through the conically shaped portion of the passage 50 for flaring the segments 58 outwardly.

The head 53 of the screw 54 is provided with the usual slots 66 to receive a suitable tool for forcing the same through the central passage in the rivet.

It will be seen by this construction that when the wood screw 22 or 54 is forced through the central passage in either of the forms of the rivets, the inner end which is in the form of segments is forced outwardly in flared condition and these flared portions at the inner end of the rivets cooperate with the shoulders on the heads of the rivets for binding the rivets securely in place and for securing the strips or plates in rigid relation. Furthermore, the peculiar formation of the wood screws which are employed will cut through the material of the rivet at the segmental portions formed on the inner ends of the rivets for not only causing the inner ends to bind securely against the inner wall of the inner plate or strip but the screws will be rigidly held against movement so that the screws will remain in place at all times.

I claim:

1. A device for securing together strips of material in flat contact in which alined perforations are formed in the strips with one perforation having outwardly flared walls, comprising a rivet having a head which provides a shoulder for engagement with one face of a strip, a cylindrical barrel portion projecting from the head and extending through the perforations and a central passage extending through the head and barrel portion, the outer end of the passage through the head being outwardly flared, the opposite or inner end of the passage tapering from points midway of the barrel portion to the inner terminal point of the passage, the inner end of the barrel portion throughout the length of the tapered portion of the central passage being provided with radial slots extending through and dividing the walls into segments and a tapered screw having a head to seat in the flared portion of the passage, the tapered threaded portion of the screw adapted when screwed into the slotted portion of the barrel to cut into the inner walls only of the slotted portion and force the segments of the barrel into engagement with the flared walls of the perforations in a strip, said central passage being unobstructed throughout its length to the tapered inner end thereof.

2. A device for securing together an outer strip to an inner strip of material in rigid flat contact in which the strips have alined perforations, the material of the strips surrounding the perforations being indented so that the opposite ends of the perforations are flared outwardly, a rivet having a head seated within the indented portion of one strip and a body portion received by the perforations of both strips, said body having a central longitudinal passage provided with an opening flared through the head at the outer end of the rivet and tapering toward the inner end thereof, the inner end of the body having radial slots to form segments which embrace the tapered end of the passage, said segments substantially closing the inner end of the central passage and a tapered screw having a head seated within the flared opening in the head of the rivet, the threads of the screw biting into the inner tapered walls of the segments only and forcing the segments outwardly so that the outer walls of the segments snugly engage the flaring walls of the inner strip of material.

EVERETT R. SWANK.